UNITED STATES PATENT OFFICE.

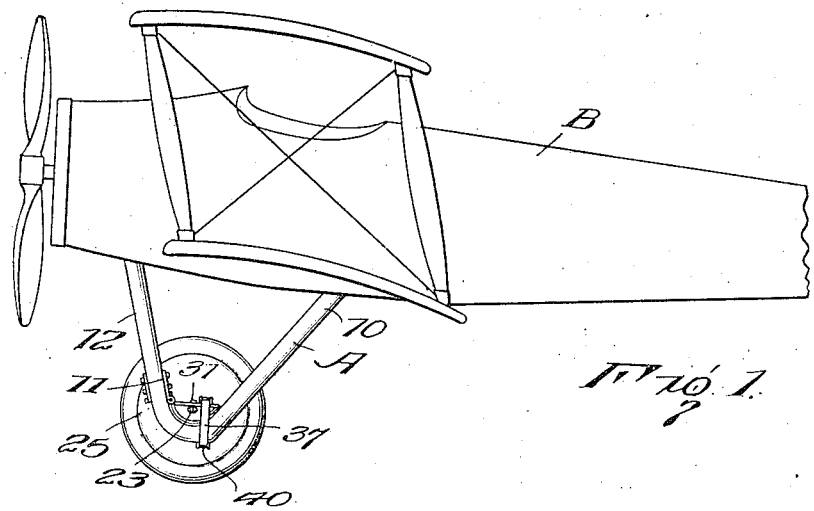
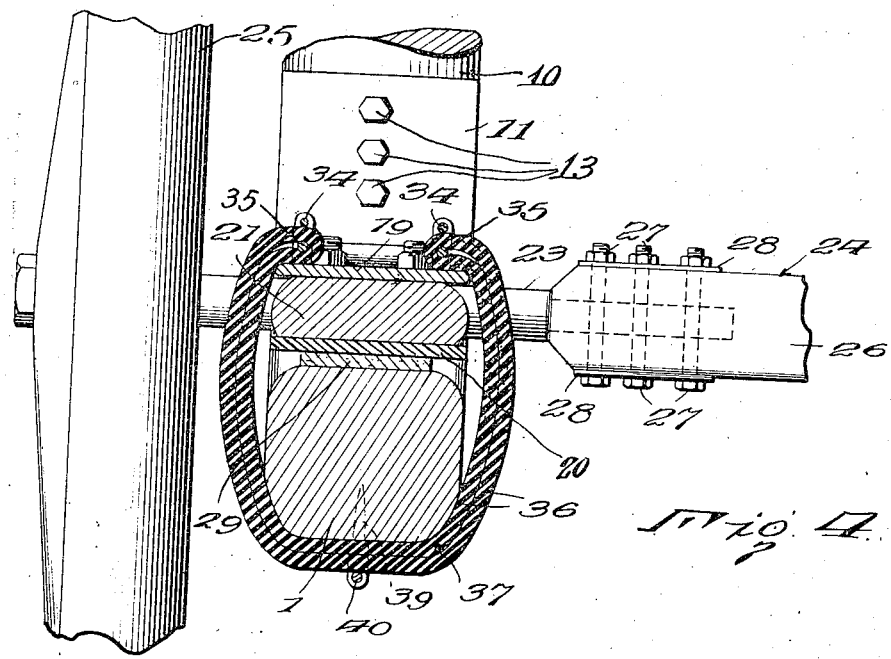

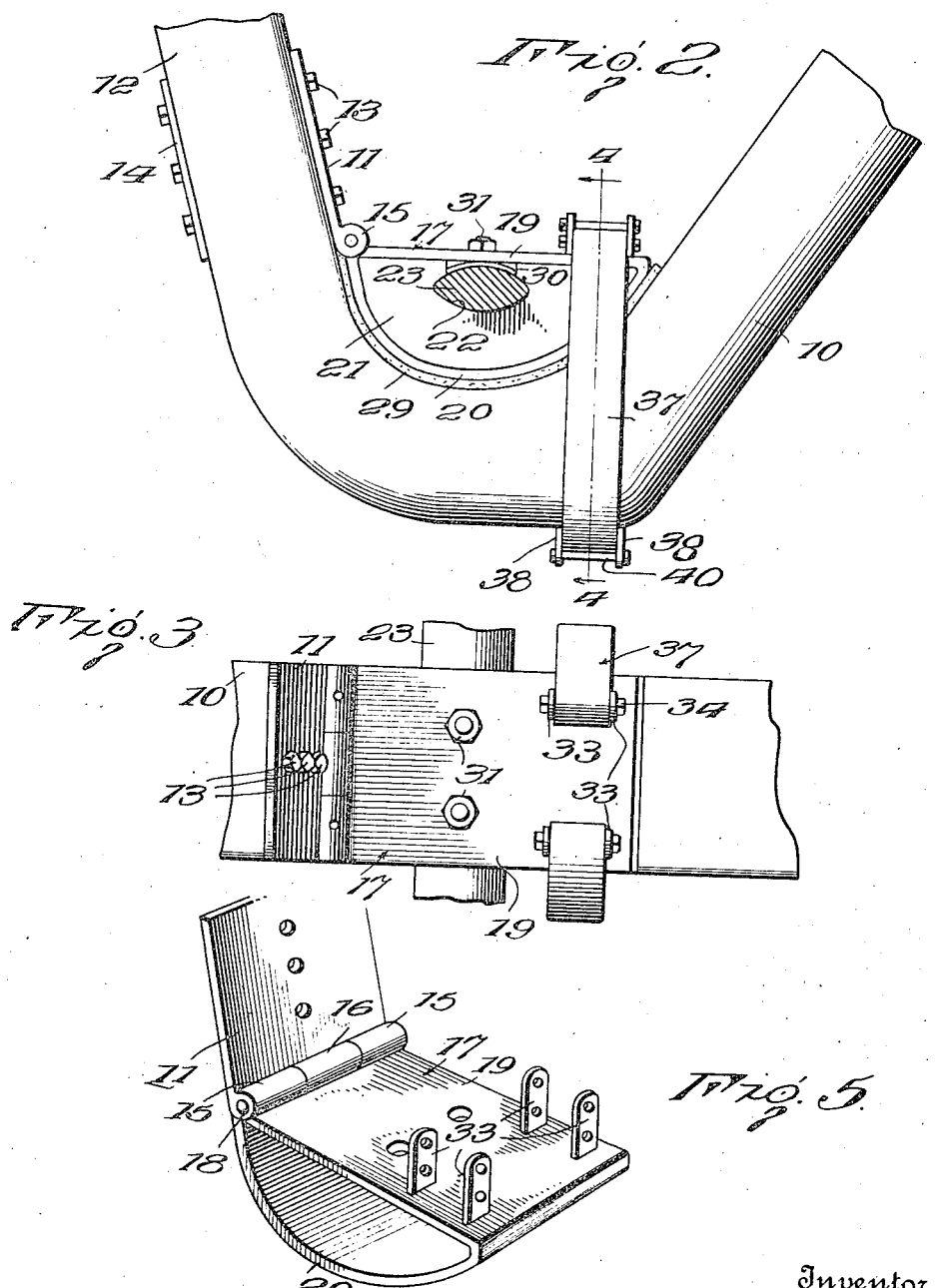

HAROLD M. KUDO, OF HONOLULU, TERRITORY OF HAWAII.

LANDING-GEAR FOR AEROPLANES.

1,387,057. Specification of Letters Patent. Patented Aug. 9, 1921.

Application filed December 1, 1919. Serial No. 341,563.

*To all whom it may concern:*

Be it known that I, HAROLD M. KUDO, citizen of the United States, residing at Honolulu, Oahu, Territory of Hawaii, have invented certain new and useful Improvements in Landing-Gears for Airplanes, of which the following is a specification.

This invention relates to under carriages or landing gears for airplanes, and an object of the invention is to provide a landing gear structure which will absorb shock incident to the landing of the airplane equipped therewith, and the subsequent travel of the said airplane over a rough surface, preventing the distributing of the said shocks to the fuselage and struts of the airplane and consequently relieving the airplane structure of the strain occasioned by such shocks.

More specifically, the invention comprehends the provision of a shock absorbing mechanism interposed in the landing gear structure of the airplane, which is designed to permit limited yieldable movement of the landing wheel carrying axle relative to the struts of the landing gear and consequently relative to the fuselage of the airplane.

Other objects of the invention will appear in the following detailed description taken in connection with the accompanying drawing, forming a part of this specification, and in which drawing:

Figure 1 is a side elevation of an airplane showing the improved landing gear applied thereto, and having one of the landing wheels removed.

Fig. 2 is an enlarged side elevation partly in section, of the shock absorbing mechanism of the landing gear structure.

Fig. 3 is a top plan of the structure illustrated in Fig. 2.

Fig. 4 is a vertical section through the landing gear taken on the line 4—4 of Fig. 2, and Fig. 5 is a detail perspective view of a part of the landing gear structure.

The improved under carriage or landing gear structure A is attached to the fuselage B of an airplane, in the usual manner, depending therefrom near the forward or nose end of the fuselage, and this landing gear structure comprises the usual substantially V-shaped struts 10 which are substantially elliptical shaped in cross section and carry the shock absorbing axle supporting structure in the saddles or pockets thereof formed at the lower connected ends of the angled sides of these substantially V-shaped struts as clearly shown in Figs. 1 and 2 of the drawings.

The shock absorbing axle supporting structures, include plates 11, which are attached to the forward upstanding portion or leg 12 of the struts 10 by means of bolts 13 which extend through this portion of the struts, and through a wear plate 14, which is attached to the side or length 12 of the strut opposite the side against which the plate 11 engages. The plate 11 has hinge barrels 15 formed upon its lower end which receive between their facing ends the hinge barrels 16 formed upon the section 17 of the hinge structure, and a suitable hinge pin 18 extends through these barrels for hingedly connecting the sections 17 to the leaves or plates 11. The sections 17 comprise flat substantially horizontal plates 19, and arcuate plates 20, the end edges of which are attached to the plates 19 in any suitable manner, such as by welding or the like. This arcuate plate 20 has its concaved surface facing the plate 19, providing a substantially semi-cylindrical space between the facing surfaces of the two plates in which a block 21 is positioned. This block 21 is preferably constructed of hard wood, such as ash, mahogany or the like, and it is provided with a longitudinally extending opening 22, which receives therethrough the substantially elliptical portion 23, of the spindle carrying end of the axle structure 24 of the landing gear. The usual type of wheels 25 are mounted upon the spindle ends of the axle 24 and these spindle ends 23 which are preferably constructed of metal are attached to the main body 26 of the axle by means of a plurality of bolts 27, and suitable wear plates 28 are mounted upon the opposite sides of the portion 26 of the axle to protect the same which is preferably hard wood, from being split under stress and also from wear by the heads of the bolts 27 or the nuts which are mounted thereon. A rubber cushion 29, is placed between the facing surfaces of the arcuate plate 20 and the struts 10, as clearly shown in Fig. 2 of the drawings, to prevent marring or wear upon the struts by the metal plate 20. A suitable saddle or clamping plate 30 is carried by the plate 19, being attached thereto by means of bolts 31 and this plate is shaped to snugly fit the portions 23 of the axle structure 24, to securely clamp the axle structure in the opening 22.

A plurality of upstanding ears 33, are formed upon the plate 19 and they are arranged in pairs as clearly shown in Fig. 5 of the drawings, the said ears receiving therethrough bolts 34, and 35. The lower bolts 35, extend between the layers 36 of an elastic member 37, as clearly shown in Fig. 4 of the drawings, for securely connecting this elastic member to the plate 19, while the bolts 34 engage across the upper surface of the outermost layer of the elastic member 37 for confining it in its proper position. The elastic band 37 is prevented from relative movement with the strut 10 at its lower portion where it engages across the strut, by means of confining guide plates 38 which are provided with threaded portions 39 which are screwed into the strut as clearly shown in Fig. 4 and a bolt 40 extends across from one of these plates to the other and exteriorly of the elastic member 37, to prevent outward movement of the elastic member relative to the strut and confining guides 38.

The axle structure 34 and consequently the landing wheels 25 are supported entirely by the blocks 21 and the hingedly supported members 17, so that upon landing, the axles, and consequently the land wheels, are permitted relative movement upon the hinge pin 18 as an axis, to the fuselage B of the airplane and also with the struts 10. However, this movement is limited by the elastic members 37 which should be of such strength as to permit limited yieldable and pivotal movement of the sections or members 17 to prevent the transmitting of shock incident to the landing of the airplane to the struts 10 and also to limit this relative movement.

In constructing the under carriage structure, the axle ends 23 are preferably inserted through the openings 22 and the nuts upon the bolts 31 are loosened, after which the blocks 21 are driven from the side between the plates 19 and 20, and into their proper positions, and the nuts upon the bolts 31 are then tightened to securely clamp the axle spindle ends 23 in the block, and if the blocks are coated with adhesive upon their outer surfaces, they will, after drying be securely maintained in their proper positions, between the plates 19 and 20.

Changes in details may be made, without departing from the spirit of this invention, but;

I claim:

1. In a landing gear for airplanes, the combination with an airplane fuselage and depending struts carried thereby, of members hingedly connected to said struts at their lower ends, block inserts carried by said members, an axle carried by said block inserts whereby the axle will be permitted limited movement relative to the struts and fuselage.

2. In a landing gear for aeroplanes, the combination with an airplane fuselage and depending struts carried thereby, said struts being of V-shaped construction, of members hingedly connected to said struts comprising a plate detachably connected to a leg of said strut, and a hinged section, comprising an arcuate portion shaped to fit the apex of said strut, and means yieldably holding the free end of said hinged member to said strut.

3. In a landing gear for aeroplanes, the combination with an airplane fuselage and depending struts carried thereby of V-shaped formation, of members hingedly connected to said struts at their lower end, each of said members comprising a plate detachably connected to a leg of the strut, and a hinged section comprising a flat plate and an arcuate plate adapted to fit the apex of said strut, a block insert for each of said hinged sections having an opening therein, wheel spindles detachably positioned within the opening of the block insert, and means resiliently connecting said hinged section to said struts.

4. In a landing gear for aeroplanes, the combination with an airplane fuselage and a substantially V-shaped strut carried thereby, of a shock absorber comprising a plate attached to a leg of the strut, and a hinged section connected to said plate, and comprising a substantially flat plate and an integral arcuate plate adapted for disposal within the apex of said strut, a block insert having an opening therein, for the reception of an axle, outstanding ears formed upon the flat hinged section, resilient means connecting near said ears and said strut for yieldably supporting the axle structure, and means carried by said strut for guiding said resilient means in a predetermined position.

5. In a landing gear for aeroplanes, the combination with an airplane fuselage, substantially V-shaped depending struts carried thereby, of members hingedly connected to said struts comprising a plate detachably connected to a leg of each of said depending struts, a hinged section connected to each of said plates, and comprising a flat plate and an arcuate plate integrally formed, said arcuate plate being concaved to be disposed within the apex of said V-shaped struts, a block insert for each of said hinged sections having an opening therein, an axle structure comprising a main body, and spindle ends detachably carried by said main body and adapted for insertion within said block insert, wheels carried by said spindles, ears upwardly projecting from said hinged section and upon the free end thereof, a resilient band connecting the free end of said hinged member to said strut, and means carried by said strut for maintaining said resilient band in a predetermined position to support the axle structure.

6. In a landing gear for aeroplanes, the combination with an airplane fuselage and depending struts carried thereby, said struts being of V-shaped construction, of members hingedly connected to said struts comprising a plate detachably connected to a leg of said struts, and a hinged section comprising an arcuate portion shaped to fit the apex of said struts, a yieldable cushion arcuate in formation, and adapted to be positioned intermediate the facing structures of the arcuate plate and the struts, and means yieldably holding the free end of said yieldable member to said struts.

7. In a landing gear for aeroplanes, the combination, with an airplane fuselage, and substantially V-shaped struts carried thereby, of members hingedly connected to said struts, said members including an arcuate portion shaped to fit the apex of the struts, an axle structure including spindles detachably connected to said hinged members inwardly from the free ends thereof, and yieldable means intermediate the axle spindles and the free ends of said hinged members, and connecting said free ends of said hinged members, and struts for yieldably supporting the axle structure.

HAROLD M. KUDO.